United States Patent [19]

Yamashita et al.

[11] 4,333,306
[45] Jun. 8, 1982

[54] STEEL CORD

[75] Inventors: Fumio Yamashita; Hideharu Kurobe, both of Ono, Japan

[73] Assignee: Hiroyuki Kanai, Ashiyo, Japan

[21] Appl. No.: 218,740

[22] Filed: Dec. 22, 1980

[30] Foreign Application Priority Data

Dec. 21, 1979 [JP] Japan .................. 54-177954[U]
Oct. 13, 1980 [JP] Japan .................. 55-146117[U]

[51] Int. Cl.³ .................. D07B 1/06; D02G 3/48
[52] U.S. Cl. .................. 57/206; 57/213; 57/216; 57/217; 57/902; 152/359
[58] Field of Search .................. 57/200, 206, 207, 209, 57/210, 212–218, 221, 223, 232, 234, 236, 237, 258, 3, 6, 7, 9, 91, 94, 902; 152/359

[56] References Cited

U.S. PATENT DOCUMENTS

| | | | |
|---|---|---|---|
| 1,759,410 | 5/1930 | Marston | 57/223 X |
| 2,876,616 | 3/1959 | Austin et al. | 57/94 X |
| 2,961,010 | 11/1960 | Berry | 57/206 X |
| 3,318,082 | 5/1967 | Riggs | 57/217 |
| 3,911,662 | 10/1975 | Fenner | 152/359 X |
| 4,176,513 | 12/1979 | Young et al. | 57/218 X |
| 4,258,543 | 3/1981 | Canevari et al. | 57/902 X |

Primary Examiner—Donald Watkins
Attorney, Agent, or Firm—Wenderoth, Lind & Ponack

[57] ABSTRACT

A steel cord composed of a plurality of material wires intertwisted, having loosely intertwisted portions and tightly intertwisted portions alternately at regular intervals so as to facilitate penetration of a rubber compound into the central part thereof throughout its whole length and to ensure stability of twist.

1 Claim, 13 Drawing Figures (a)

(b)

(a)

(b)

(c)

(d)

(e)

(b)

(c)

(d)

STEEL CORD

BACKGROUND OF THE INVENTION

This invention relates to a steel cord for use as reinforcement of tires, belts, etc.

Generally, this kind of steel cord is made by intertwisting a plurality of material wires arranged in parallel state and is covered with a rubber compound. When a steel cord is used as reinforcement, good adhesion of material wires to the rubber compound is an indispensable requirement; in other words, in order to enable a steel cord to perform its duties as a reinforcement, it is required that material wires and the rubber compound are formed into a perfectly integrated substance. In the case of tires, for example, poor adhesion of material wires to the rubber compound causes the so-called "separation phenomenon" (wire and rubber compound separate from each other) during the running of a car, with a resultant reduction of the function of the tires. Also, poor adhesion causes rusting of material wires due to moisture contained in the rubber compound and moisture in the ambient atmosphere, with the result being the deterioration of cord strength to a large extent and earlier occurrence of "separation phenomenon".

The conventional steel cord 1 is formed by twisting together a plurality of material wires 2 so that its cross section is as shown by FIG. 1(a) and FIG. 1(b), in which 2' is a core strand. When a conventional steel cord is covered with a rubber compound, the rubber compound is not allowed to penetrate into the central part of the steel cord 1 because material wires are in tight contact with each other and thus a space is left at the central part of the steel cord and good adhesion between the steel cord and the rubber compound cannot be obtained.

In order to eliminate the above disadvantage of the conventional steel cord, steel cord (3) (sometimes called "open cord") which is made by twisting together material wires, loosely with a gap left between adjoining wires as shown by FIG. 2(a) and FIG. 2(b), so that the rubber compound may penetrate into the central part of a steel cord and adhere to the whole circumference of material wires, has been taken into consideration. In this case, however, since the steel cord 3 is loose in intertwisting throughout its whole length, from its construction it has such disadvantages that material wires are one-sided as shown by FIG. 2(c), FIG. 2(d) and FIG. 2(e) or twist becomes uneven in lengthwise direction of a cord. Therefore, even if the rubber compound penetrates into the central part of a cord, the modulus of a steel cord as an integrated substance lowers as shown by FIG. 5 and also its compression flexing fatigue characteristic deteriorates. Thus, plural material wires constituting a steel cord do not display their strength as an integrated substance and one or two wires which are easier to be affected by stress break much earlier.

On the other hand, it is impossible practically to manufacture the steel cord 3 having a cross sectional shape as shown by FIG. 2(a) or FIG. 2(b) throughout its whole length, though it is possible to have such cross sectional shapes partly in the whole length of a steel cord, because material wires constituting a steel cord are not in contact with each other, in other words, must be arranged spatially.

SUMMARY OF THE INVENTION

The present invention is intended for eliminating the above-mentioned disadvantages of the conventional steel cord and provides a steel cord having perfect adhesion between material wires and the rubber compound and also stabilized twist construction.

The nature and advantage of the present invention will be understood more clearly from the following description made with reference to the accompanying drawings, in which:

DETAILED DESCRIPTION OF THE INVENTION

Figure 1:
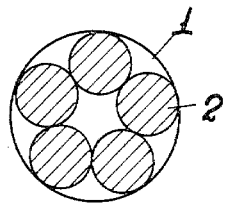
FIG. 1(a) and FIG. 1(b) respectively show a cross section of a conventional steel cord.
Figure 1:
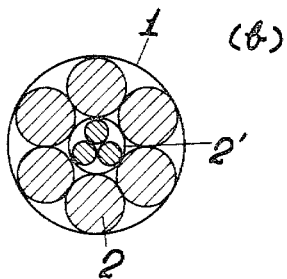
Figure 2:
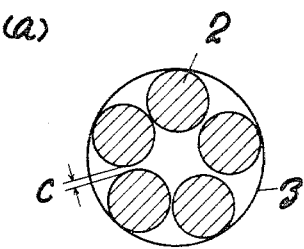
FIG. 2(a) and FIG. 2(b) respectively show a cross section of a steel cord having material wires intertwisted loosely with a gap therebetween.
FIG. 2(c), FIG. 2(d) and FIG. 2(e) show cross sections of a steel cord whose material wires are one-sided during use.
Figure 2:
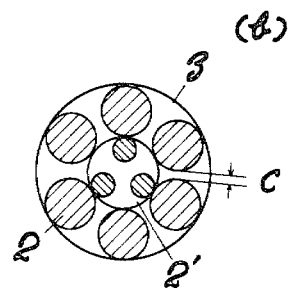
Figure 2:
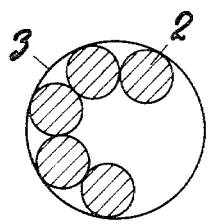
Figure 2:
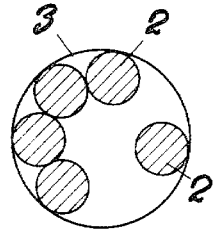
Figure 2:
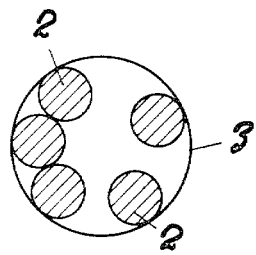
Figure 3:
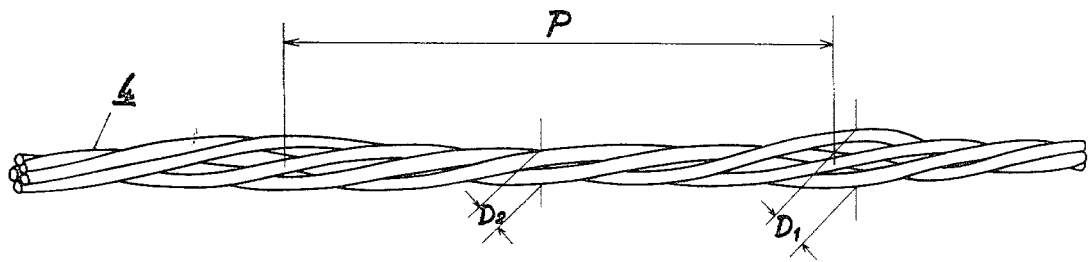
FIG. 3(a) is a front view of an embodiment of the present invention.
FIG. 3(b) being a front view of a different embodiment.
FIG. 3(c) being a cross section, on an enlarged scale, of the part $D_2$ in (a) and (b), and FIG. 3(d) being a cross section, on an enlarged scale, of the part $D_1$ in (a) and (b)
Figure 3:
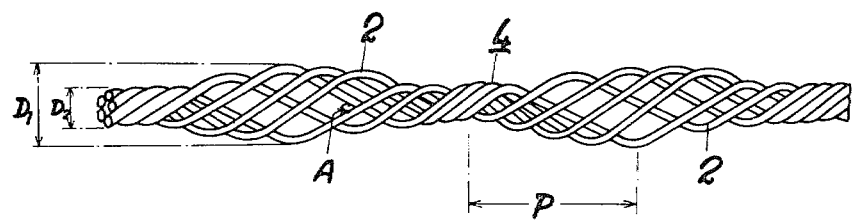
Figure 3:
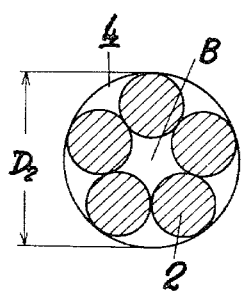
Figure 3:
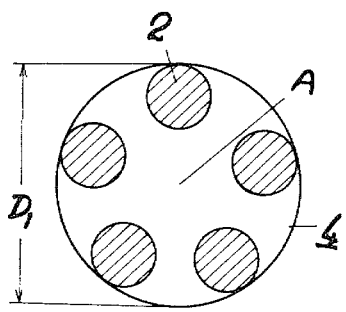

Referring to FIG. 3, numeral 4 denotes a steel cord according to the present invention. Numeral 2 denotes a material wire. P, $D_1$ and $D_2$ denote respectively a twist pitch, the diameter of a steel cord at the portion where intertwisting is loose and the diameter of a steel cord at the portion where intertwisting is tight. In the embodiment shown by FIG. 3(a), material wires of the steel cord 4 are twisted together in such a manner that a loosely intertwisted portion and a tightly intertwisted portion alternate with each other in each pitch (distance between two loosely intertwisted portions).

In the embodiment shown by FIG. 3(b), material wires of the steel cord 4 are intertwisted in such a manner that a loosely intertwisted portion and a tightly intertwisted portion alternate with each other in every two pitches (a distance between loosely intertwisted portions).

Figure 5:
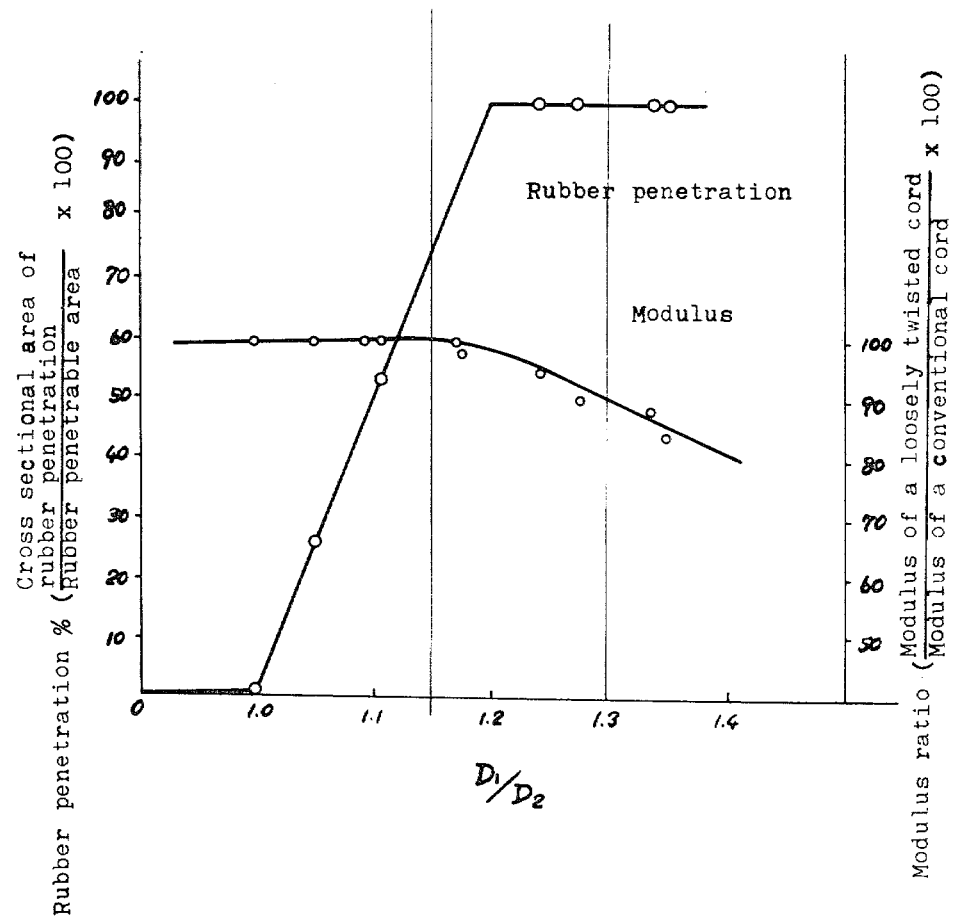
FIG. 5 shows the relationship between the degree of penetration a rubber compound into a steel cord according to the present invention and the modulus ratio of a loosely twisted cord and a conventional cord.

When a steel cord according to the present invention have the above-mentioned construction is covered with a rubber compound, as shown in FIG. 3(c) and FIG. 3(d), the rubber compound which has penetrated into the central part A through gaps between adjoining material wires advances in the lengthwise direction of the steel cord and penetrates further into the central part B at a tightly intertwisted portion of the steel cord and fills it, thus covering the whole surface of the steel cord. Since the intertwisting is tightened at intervals of one pitch, stability of twist can be obtained easily, with resultant production of a steel cord with a plurality of material wires integrated. As shown by FIG. 5, the value of $D_1/D_2$ ($D_1$ is the diameter of a cord at the portion where intertwisting is loose and $D_2$ is the diameter of a cord at the portion where intertwisting is tight) is determined for its lowest limit by the degree of penetration of the rubber compound and its least upper bound is determined for maintaining the mechanical property of a steel cord. It is known that this value is affected by the construction of a steel cord, viscosity of the rubber compound and other factors and also relates to the twist pitch.

Figure 4:
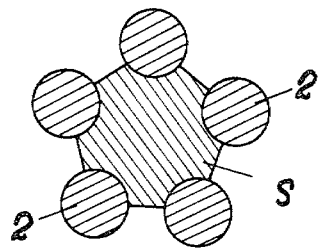
FIG. 4 is a schematic view of a steel cord according to the present invention as it is infiltrated with rubber compound.

In FIG. 3(a), for example, suppose a steel cord for tires is $1 \times 5 \times 25$, twist pitch 10 mm, $D_2 = 0.7$ (the diameter of a cord at the portion where intertwisting is tight) and $D_1/D_2 = 1.15-1.3$, the rate of rubber penetration into a steel cord as a whole is more than 75% in terms of a percentage of rubber occupying the S part shown in FIG. 4. Also, the modulus of a steel cord shown after penetration of rubber is more than 90 on the basis of 100 in the case of the conventional steel cord. This relationship is as shown by FIG. 5. In FIG. 3(b), if a steel cord is composed under the same condition as above, $D_1/D_2$ is shown as 1.2-1.4, namely, the effect of the same level as in the case of FIG. 3(a). The foregoing can be applied to the case of a steel cord having a cord strand.

As stated hereinbefore, since a steel cord according to the present invention has a loosely intertwisted portion and a tightly intertwisted portion alternately at regular intervals, it is possible to stabilize material wires at each tightly intertwisted portion and to give space at each loosely intertwisted portion, with the result that disorder of material wires is minimized and intertwisting is stable. When the steel cord is covered with rubber compound, the rubber compound penetrates into the steel cord through space between loosely intertwisted material wires. At the portion where material wires are intertwisted tightly to such an extent that rubber compound is not allowed to penetrate from the surface of a steel cord, the rubber compound which has penetrated through gaps between loosely intertwisted material wires parts right and left and further penetrates into space at the central part of the steel cord in a lengthwise direction. Thus, the steel cord is covered perfectly with the rubber compound, with the result that very strong adhesion is attained and anti-rusting of steel cord itself is ensured.

As compared with a steel cord composed of tightly intertwisted material wires, a steel cord composed of loosely intertwisted material wires is easy to change in mechanical property, for example, in elongation. Therefore, it is required to make the extent of loose intertwisting as small as possible. According to the present invention, loosely intertwisted portions account for only $\frac{1}{2}$ or $\frac{1}{3}$ of the whole length of a steel cord and accordingly the change of mechanical property is within the permissible extent. Thus, a steel cord according to the present invention is on the same level with a conventional steel cord in respect of mechanical property, even though it has loosely intertwisted portions.

What we claim is:

1. A steel cord composed of a plurality of material wires intertwisted, wherein loosely intertwisted portions and tightly intertwisted portions alternate with each other, and wherein a distance between loosely intertwisted portions is made one pitch or two pitches and wherein the ratio of the cord diameter at a loosely intertwisted portion $D_1$ to the cord diameter at a tightly intertwisted portion $D_2$ is in the range of from 1.15 to 1.4.

* * * * *